May 19, 1964　　　　　　　G. ARLT　　　　　　3,134,082
TRANSMISSION DEVICE HAVING A PREFERRED TRANSMISSION DIRECTION
Filed May 27, 1960　　　　　　　　　　　　　2 Sheets-Sheet 1

INVENTOR
GOTTFRIED ARLT.
BY
AGENT

May 19, 1964 G. ARLT 3,134,082
TRANSMISSION DEVICE HAVING A PREFERRED TRANSMISSION DIRECTION
Filed May 27, 1960 2 Sheets-Sheet 2

INVENTOR
GOTTFRIED ARLT.
BY
AGENT

United States Patent Office 3,134,082
Patented May 19, 1964

3,134,082
TRANSMISSION DEVICE HAVING A PREFERRED TRANSMISSION DIRECTION
Gottfried Arlt, Aachen, Germany, assignor to North American Philips Company, Inc., New York, N.Y., a corporation of Delaware
Filed May 27, 1960, Ser. No. 32,345
Claims priority, application Germany June 24, 1959
9 Claims. (Cl. 333—24.1)

The invention relates to a transmission device having a preferred transmission direction, particularly a so-called uni-line.

Most of the devices of this kind hitherto employed are the electronic or electric amplifiers. The amplifiers comprise, however, so-called active elements and require a supply current, though of low value, which is necessary in order to provide for energy amplification. There are, however, many circumstances in which it is desirable to economize one amplifier, if necessary at the expense of an important loss of signal energy; however, hitherto an amplifier has been required to insulate the signal source from the consuming device since otherwise unwanted reactions of the latter on the signal source would occur. This applied particularly to the supply to a plurality of consuming devices from one signal source or to the supply to one consuming device from a plurality of signal sources, in which cases reactions between the consuming devices or the signal sources are to be avoided.

For such isolating purposes use has been made of gate circuits, which, however, also comprise active, controllable elements. The four-wire termination with network for balancing the two-wire line used in telephony are not uni-lines, but hexapole devices, by means of which the transmission takes place from the line to a consuming device and from the signal source to the line, whilst a transmission or reaction from the signal source to the consuming device or conversely is suppressed.

The invention has for its object to provide a transmission device by means of which reactions between consuming devices and signal sources can be very drastically suppressed without the use of active elements.

Such transmission devices comprising a gyrator are already known. A gyrator is a quadripole, in which the transmission is represented by the equations:

$$U_1 = R_{11}I_1 - R_{12}I_2 \qquad (1)$$
$$U_2 = -R_{12}I_1 - R_{22}I_2$$

wherein $U_1$ and $U_2$ are the input and the output voltage respectively, $I_1$ and $I_2$ are the currents in the input and the output circuits respectively, $R_{11}$ and $R_{22}$ are the input and the output resistances respectively and $R_{12}$ is the transmission resistance in the chosen direction. Such gyrators may be based on different phenomena. One can, for example, imagine dynamo-mechanical-mechano-static gyrators: the electromagnet of a dynamic loudspeaker causes the movable electrode of a variable capacitor to move the capacity variations thus occurring are again converted into voltage variations.

With a magnetostrictive-piezoelectric gyrator, input currents produce variations of the length of a magnetostrictive rod, which in turn exerts a variable pressure on a piezoelectric crystal. A corresponding, variable voltage is then produced at the electrodes of the piezoelectric crystal. A known gyrator is the Hall gyrator. In its form hitherto known it consists of a comparatively thin, rectangular plate of semi-conductive material in which the free charge carriers have a great mobility, this plate having two pairs of peripheral electrodes and being exposed to the effect of a magnetic field at right angles to the main surfaces of the plate. The transmission efficiency $\eta$ of such gyrators is a function of the shape and the dimensions of the plate, of the mobility $\mu$ of the free charge carriers in the plate and of the magnetic inductance B of the field traversing the plate. Owing to the losses occurring in the plate itself, the efficiency cannot exceed a maximum value of about 0.17.

In the said unidirectional transmission devices with a Hall gyrator, each input electrode is connected to a corresponding output electrode via an auxiliary resistor. The transmissions via the gyrator and the resistors support one another in one direction and compensate one another at least partly in the opposite direction. By a suitable choice of the said resistors, a theoretically infinitely large damping of the signals in the blocking direction can be obtained. To this end the auxiliary resistors $R_s$ must be equal to the sum of the squares of the input resistance and of the transmission resistance in the chosen forward or passing direction in the absence of the auxiliary resistors, divided by the transmission resistance in the opposite direction, also taken in the absence of the auxiliary resistors. However, an important part of the input signals also gets lost in the auxiliary resistors, so that the total efficiency of the transmission device in the chosen direction and with an infinite product $\mu B$ cannot exceed a maximum value of 0.25.

The transmission device according to the invention is characterized by the series-parallel connection of a gyrator and of a transmission transformer. The voltages or currents transmitted via the gyrator and via the transformer reinforce one another in one direction and cancel one another at least partly in the opposite transmission direction.

For most desired uses, it is desirable and in most cases it is possible to adapt the coupling via the gyrator and the coupling via the transformer to each other so that in one direction the voltages or currents inductively transmitted via the gyrator and via the transformer cancel one another, at least substantially.

The gyrator is preferably a Hall gyrator; most advantageous is a gyrator having an anisotropic construction of at least one of the current circuits, as described in a copending U.S. application Serial No. 20,284 filed April 6, 1960.

The invention will now be described more fully with reference to the drawing, in which FIG. 1 shows a general principle diagram of a transmission device according to the invention.

Figure 1:
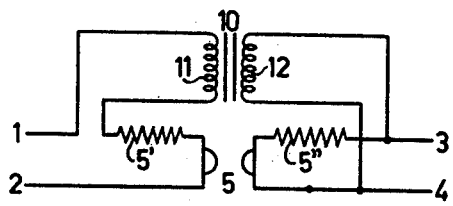

FIG. 1 shows the general principle diagram of a transmission device according to the invention. The gyrator 5 is indicated by a general symbol, which only shows that one has to do with a quadripole, the operation of which corresponds to the Equations 1. It should be noted that, in an ideal gyrator, the resistors $R_{11}$ and $R_{22}$ are equal to zero. The transmission device according to the invention can, however, not be constructed with such a gyrator which, in fact, does not exist; therefore the internal resistances 5' and 5" are indicated as connected in series with the circuits of the gyrator.

In accordance with the invention a winding 11 of a transformer 10 is connected between the input- or output-terminals 1, 2, in series with the resistance 5' and with one of the circuits of the gyrator 5. The other winding 12 of the transformer is connected between the output- or input terminals 3, 4, in parallel with the other circuit of the gyrator and with the resistance 5".

It is assumed that the transformer is free of losses. The Equations 1 are applicable to the gyrator. The equations of the transformer are:

$$U_1 = j\omega L_1 I_1 - j\omega M I_2$$
$$U_2 = j\omega M I_1 - j\omega L_2 I_2 \qquad (2)$$

wherein $L_1$ and $L_2$ designate the inductances of the windings 11 and 12 respectively and $M$ designates the mutual inductance. By adding the series-parallel matrix elements of the Equations 1 and 2, one obtains the following quadripole equations for the arrangement shown in FIG. 1:

$$U_1 = \left(\frac{M}{L_2} + \frac{R_{12}}{R_{22}}\right)U_2 + \frac{1}{4}\left(\frac{|R|}{R_{22}} + j\omega \frac{L_1 L_2 - M^2}{L_2}\right)I_1$$

$$I_2 = -\left(\frac{1}{j\omega L_2} + \frac{1}{R_{22}}\right)U_2 + \left(\frac{M}{L_2} - \frac{R_{12}}{R_{22}}\right)I_1 \qquad (3)$$

wherein $/R/$ is equal to $R_{11} + R_{22} + R_{12}^2$.

From the Equations 3, it is evident that the device shown in FIG. 1 has the properties of an isolator if:

$$M/L_2 = \pm R_{12}/R_{22} \qquad (4)$$

In the case of the minus-sign, $U_1$ is independent of $U_2$, whilst $I_2$ (and hence also $U_2$) depends on $I_1$: energy passes from the terminals 1, 2 to the terminals 3, 4, whilst blocking takes place in the opposite direction.

In the case of the plus sign, however, $U_1$ is a function of $U_2$, and $I_2$ does not vary with $I_1$; energy transmission occurs from the terminals 3, 4 to the terminals 1, 2, whilst blocking occurs in the opposite direction.

In accordance with the general quadripole theory, the characteristic output impedance of the quadripole should be chosen as matching resistance in the pass-direction, which impedance amounts in the first case to:

$$Z_2 = /R/\frac{R_{22}}{R_{11}} \qquad (5)$$

With this optimum adaptation, the efficiency $\eta$ of the transmission can be calculated in a simple manner. It appears that:

$$\eta = \frac{X}{X+1} \qquad (6)$$

wherein $$X = \frac{R_{12}^2}{R_{11} R_{22}}$$

It has hitherto been assumed that the transmission transformer of the device is an ideal, loss-free transformer. In fact this does not occur: the transmission transformer always has a loss resistance and the inductances of its windings always have a finite value. The loss resistance of the transmission transformer must and can be compensated by including suitable impedances in the gyrator circuit. The finite inductances of the windings of the transmission transformer produce a reduction in the transmission-efficiency $\eta$ of the device in the forward direction. If, for example, the transformer 10 is an air-core transformer with inductances $L_1$ and $L_2$ and loss resistances $R_1$ and $R_2$ of the windings 11 and 12 respectively and a mutual inductance $M$, the Equation 4 must be fulfilled and, in order to compensate the loss resistances, a capacitor with a capacity $C$ must be included in series in the circuit connected to the terminals 3, 4 of the gyrator 5 and including the loss resistance 5''. The value of this capacitor $C$ is:

$$C = \frac{L_2}{R_2 \times R_{22}} \qquad (9)$$

Instead of using a capacitor $C$, use may be made of compensating inductance, which is to be connected in parallel with the other current circuit of the gyrator including the loss resistance 5'. The value of this inductance $L$ is:

$$L = \frac{L_2(R_{11} \cdot R_{22} + R_{12}^2)}{R_2 \cdot R_{22}} \qquad (10)$$

If, in addition, any magnetisation losses of the transmission transformer are to be compensated the compensation, cannot be calculated nor realized in a simple manner. However, at least for narrow frequency bands, such compensation is in principle always possible.

Figure 2:
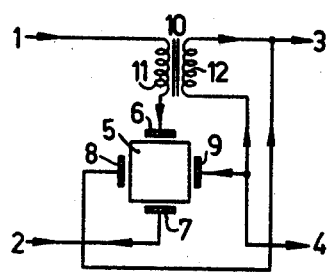
FIG. 2 shows diagrammatically a first embodiment of this device, comprising a Hall gyrator.

The transmission device shown in FIG. 2 comprises two input terminals 1, 2 and two output terminals 3, 4. The device comprises a rectangular plate 5 of a semi-conductive material with great mobility of the charge carriers, for example, of indium-antimony or indium-arsenide. This plate is arranged in a magnetic field (not shown), for example, in the field of a permanent or electromagnet, which field has a component at right angles to the main surfaces of the plate. The plate has a pair of peripheral electrodes 6, 7 and a further current circuit, which extends between the electrodes 8 and 9 of a second pair of peripheral electrodes. The path between the electrodes 6 and 7 is transversal, in this case at right angles, to the path between the electrodes 8 and 9.

The input circuit of the device extends from the terminal 1 via the primary winding 11 of the transformer 10 to the electrode 6 and from the electrode 7 to the terminal 2.

The output circuit extends from the terminal 3 to the electrode 8 and from the electrode 9 to the terminal 4, whilst the secondary winding 12 of the transformer 10 is connected in parallel with the path between the electrodes 8 and 9, between the terminals 3 and 4.

Owing to this series-parallel connection of the windings 11 and 12 of the transformer 10 with the paths between the electrodes 6 and 7 and 8 and 9 respectively, the transmission to the terminals 3 and 4 by Hall effect, via the plate 5, of signals applied between the terminals 1 and 2 is reinforced by the transmission of these signals via the transformer 10, for example by a factor of about 6 db. With the same directions of the magnetic field and of the current between the terminals 3 and 4 considered as being the input terminals, the polarity of the output voltage produced across the winding 11 is equal to the polarity of the input voltage applied in the first case across this winding. With the same directions of the field and of the current between the electrodes 8 and 9 operating as a control-current, the polarity of the Hall voltage produced between the electrodes 6 and 7 is opposite that of the input voltage applied in the first case between these electrodes and of the voltage produced across the winding 11, so that the difference between the said Hall voltage and the last-mentioned induced voltage is operative at the terminals 1, 2.

This is a direct consequence of the mechanism of the transmission by Hall effect: the magnetic field produces a deflection of the energizing circuit in a given direction and, owing to this deflection, a Hall voltage is produced at right angles to the direction of the energizing current. If in the transmission from the terminals 1, 2 to the terminals 3, 4 a current flowing to the electrode 6 produces a Hall voltage which drives a current to the electrode 9, a current flowing to the electrode 9 must, in the transmission from the terminals 3, 4 to the terminals 1, 2 produce a Hall voltage which drives a current to the electrode 7. In fact, the energizing current in both cases deflected in the same direction by the unvarying magnetic field.

The inductances of the windings 11 and 12 and the mutual inductance of the transformer 10 being chosen in accordance with Equation 4, the transmissions by Hall effect and by the transformer are mutually reinforced in one direction within a given frequency range (for example, from the terminals 1, 2 to the terminals 3, 4), whereas they cancel one another in the opposite direction. The pass-direction can be inverted by reversing the direction of the magnetic field and hence the direction of the deflection of the energizing current. In the absence of a magnetic field across the plate 5, the transmission via this plate does not take place, whilst it is maintained in both directions via the transformer 10.

The device described above is capable of replacing, within the frequency range for which the transformer 10 has been designed, a device of the aforesaid kind with two resistors, whilst the total damping in the transmission or pass-direction is approximately twice lower than in the said known device, owing to the suppression of the losses in the resistors.

If the product $\mu B$ of the mobility of the charge-carriers and of the magnetic inductance across Hall plate 5 approaches an infinite value, or if the so-called Hall angle approaches the value of 90°, $x$ becomes equal to unity and, with an optimum adaptation, $$\eta = \frac{X}{X+1} = 0.5$$

Figure 3:
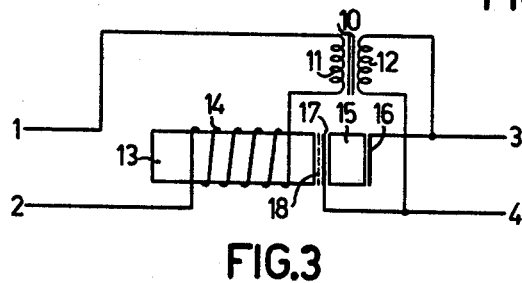
FIG. 3 shows diagrammatically one embodiment comprising a magnetostrictive-piezoelectric gyrator.

The embodiment shown in FIG. 3 and including a magneto-strictive-piezoelectric gyrator comprises a transformer 10 with windings 11 and 12, which are connected in series and in parallel respectively with the circuits of the gyrator.

The gyrator consists of a rod 13 of a ferro-magnetic substance with pronounced magnetostrictive properties, which rod is provided with a winding 14, and furthermore of a piezo-electric crystal 15. As is shown, the winding 14 is connected in series with the winding 11 of the transformer 10, whereas the electrodes 16 and 17 of the piezo-electric crystal 15 are respectively connected to the terminals 3 and 4 of the device, so that this crystal is connected in parallel with the winding 12.

A current passing through the winding 14 produces corresponding length variations of the rod 13. The rod 13 is fixedly secured, for example, on the left-hand side, whilst the crystal 15 with the electrodes 16 and 17 is pressed against an insulation 18 and the right-hand end of the rod 13, so that to each length of the rod 13 corresponds a given pressure on the crystal 15 and hence a given voltage between the electrodes 16 and 17.

It can be proved that the general Equations 1 of the gyrator can be fulfilled by such a magnetostrictive-piezoelectric device.

A transmission by Hall effect can be improved, as described with reference to the embodiments of the FIGS. 4 to 7 on the principle set forth in the application Serial No. 20,284, filed April 6, 1960, by using anisotropic connexions, for example, by subdividing the electrodes 6 and 7 and/or 8 and 9 of FIG. 2 into partial electrodes. In this case, the partial electrodes corresponding with an electrode must be insulated from each other within the frequency range to be transmitted, for example by transformers, except on the part of their respective circuits within the plate 5.

Figure 4:
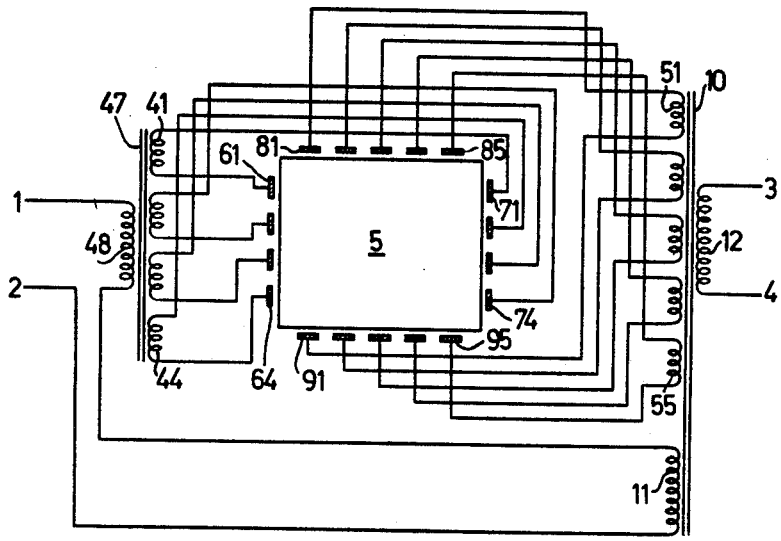
FIGS. 4 and 5 show further embodiments of unidirectional transmission devices according to the invention, comprising Hall gyrators.

The embodiment shown in FIG. 4 represents an improvement of the device shown in FIG. 2 by subdivision of the electrodes 6, 7, 8 and 9 of the plate 5 into groups of 4 and 5 electrode portions respectively. The Hall plate 5 has a first pair of opposite groups of four electrode portions 61–64, 71–74 respectively and a second pair of opposite groups of five electrode portions 81–85 and 91–95 respectively. The opposite electrode portions, for example, 61–71, are connected to each other via a winding, for example, the winding 41, of a transformer 47. In a similar manner, the opposite electrode portions of the other pair of the groups of electrode portions, for example, the electrode portions 81–91, are connected to each other via a winding, for example, the winding 51, of a second transformer. The circuits of the various pairs of opposite electrode portions are insulated from each other, with the exception of their respective paths via the semi-conductive body 5 itself.

The said second transformer is the transformer 10 of FIGS. 1 to 3, which is now provided with the additional windings 51–55, so that it can serve at the same time as an input or output transformer of the gyrator with the Hall plate 5, so that a third transformer is economized. The winding 11 of this transformer is connected, between the terminals 1 and 2, in series with the input or output winding 48 of the transformer 47.

In the case of a subdivision of the electrodes of a Hall plate into electrode portions, the transmission efficiency of the gyrator is strongly improved and hence also the transmission efficiency $\eta$ of the transmission device in the forward or pass-direction. Its limit value (for $\mu B = \infty$ or $x = 1$) is $$\eta = \frac{n.m}{n.m + 1} \quad (11)$$

wherein $n$ and $m$ designate the number of electrode portions of each group of one pair and of the other pair of groups of electrode portions. In the case of loss-free transformers and with the most favourable matching, the limit value of the transmission efficiency of the device shown in FIG. 4 is equal to:

$$\eta = \frac{4 \times 5}{4 \times 5 + 1} = \frac{20}{21} = 0.95$$

in the pass direction.

Figure 5:
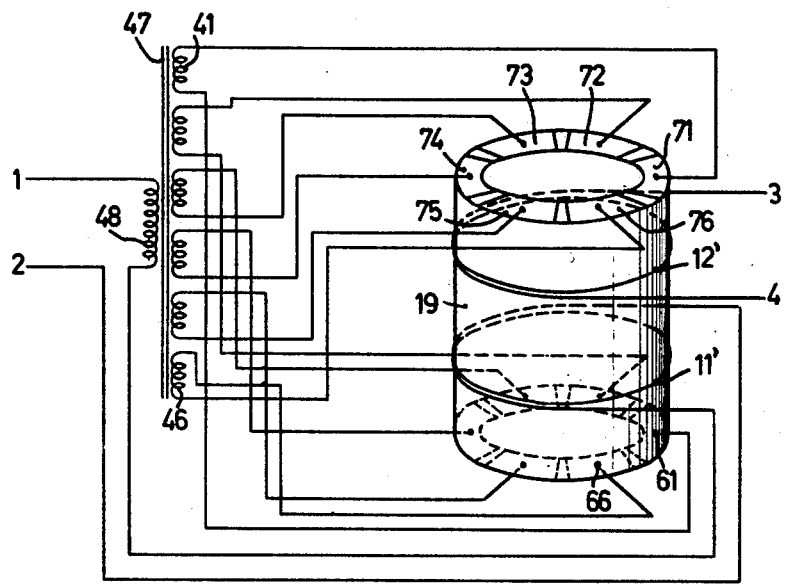

The embodiment shown in FIG. 5 is very similar to that shown in FIG. 4. The Hall plate 5 is replaced by a thin cylinder 19 of a semi-conductive material with great mobility of the charge carriers, the edges of which cylinder are provided with a pair of opposite groups of electrode portions 61–66 and 71–76. This cylinder is exposed to the effect of a radial magnetic field (not shown). The circuits between opposite electrode portions via parts of the body 5 of FIG. 4, for example, between the electrode portions 81 and 91, and via the transformer windings concerned, for example, the winding 51, are replaced by corresponding short cylinder sections of the body 19, which are closed on themselves and hence constitute windings of one turn each. Consequently, for the transmission, the cylinder 19 may be considered to be identical to a very large number of parallel-connected windings insulated from each other, with the exception of the path via the semi-conductive body, i.e. the plate 5. These windings replace the windings 51 to 55 of the transformer 10 of FIG. 4 and are tightly coupled with a winding $12^1$ surrounding the cylinder 19 and corresponding to the winding 12 of the transformer 10 of FIG. 4. A winding $11^1$, connected in series with the winding 48 of the transformer 47 is again tightly coupled to this winding $12^1$. Conversely, a further winding (not shown) of the transformer 47 could be connected in series with the winding $12^1$. In this case this transformer would serve for coupling the circuits of the electrode portions 61—71, 62—72 and so on to the terminals 1, 2 and would at the same time play the role of the transmission transformer 10 of FIGS. 1 to 3.

In order to attain a satisfactory efficiency, the winding $12^1$ must be intimately coupled with the whole length of the cylinder 19. Consequently, this winding must engage the total effective length of this cylinder.

In accordance with the ideal, anisotropic subdivision of the cylinder 19 into a very great number of parallel-connected windings, the value $m$ or $n$ of the Equation 11 is theoretically infinite, so that even a single pair of peripheral electrodes would be capable of providing a very satisfactory efficiency. A subdivision of the peripheral electrodes into electrode portions 61–66 and 71–76 is, however, desired, on the one hand in order to reduce losses in the proximity of the edges of the cylinder 19 and on the other hand in order to utilize the semi-conductive body with better efficiency by better distribution of the "axially directed" currents in the whole body.

The manufacture of a thin, hollow cylindrical body, such as the body 19 of FIG. 5, is at present still very difficult. Instead of using such a body, use can be made, however, of $n$ narrow strips of semi-conductive material, for example six strips. These strips are provided with an electrode at each end and with $m$ electrode portions on each long peripheral surface. The strips are arranged side by side around an axis and parellel thereto. Their terminal electrodes then correspond to the electrode portions 61 to 66 and 71 to 76 respectively of FIG. 5 and their lateral electrode portions are interconnected so that $m$ parallel, approximately circular closed windings are formed each by a section of each strip and by $n$ connections between the electrode portions of corresponding sections. With optimum matching, loss-free transformers and with an optimum choice of the inductances and of the mutual inductance of the transmission transformer, the expression (11) again gives the upper limit value of the transmission efficiency in the pass direction.

Figure 6:
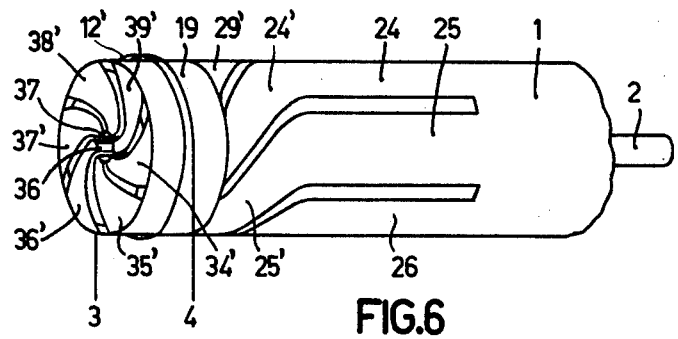
FIGS. 6 and 7 show corresponding embodiments for the transmission of very high frequencies.

In the embodiment shown in FIG. 6, input terminals 1 and 2 are connected to the outer conductor and the inner conductor respectively of a coaxial cable, the end of which is subdivided by slots, in accordance with application Serial No. 20,284, into a plurality of conductor portions 24–29 and 34–39 respectively. In accordance with copending application Serial No. 32,161, filed May 27, 1960, the terminal parts 24'–29' of the conductor portions 24–29 associated with the outer conductor are helically wound around the cable axis and constitute electrode portions which are provided on a circular edge of a hollow cylinder 19 of semi-conductive material. On the other circular edge of the cylindrical body 19 are also provided electrodes 34'–39', which extend from this edge towards the interior as the spokes of a wheel and are connected to the conductor portions 34–39 of the inner conductor 2. These spokes constitute electrodes, which are also helically wound around the cable axis, but in opposite direction with respect to the terminal parts 24'–29'. A coaxial winding 12' surrounds the body 19 and is connected to the output terminals 3, 4 and provision is made of means (not shown) to produce a magnetic field in a radial direction through the body 19. At the very high frequencies to be transmitted, the effective length of the conductor portions 24–29 and that of the conductor portions 34–39 is approximately equal to one quarter wave or to an odd multiple thereof.

Owing to the helical shape of the terminal parts 24'–29' and the spokes 34'–39' the high-frequency currents passing through these parts has a rotational component, so that the circuit via the cable 1, 2 and the body 19 is inductively coupled to the winding 12'.

Owing to the Hall effect occurring in the cylindrical body 19, rotational currents are on the other hand produced in this body itself, which currents also induce corresponding currents in the winding 12'.

The circuit between the terminals 1, 2 is therefore coupled to the circuit between the terminals 3, 4 both directly inductively and by Hall effect. With a suitable choice of the inductive coupling and of the Hall effect coupling, the device shown in FIG. 6 operates in the same manner as the embodiment shown in FIG. 2 within the frequency range determined by the length of the conductor portions 24–29 and/or 34–39.

Figure 7:
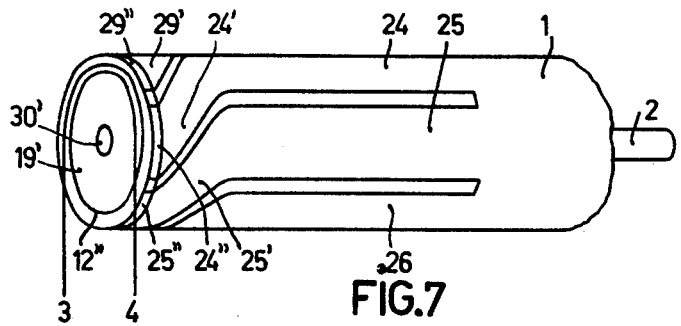

The embodiment shown in FIG. 7 differs from that shown in FIG. 6 in that it comprises, instead of a hollow cylindrical body 19, a circular disc of semi-conductive material 19'. The inner conductor 2 of the coaxial cable is not subdivided into conductor portions. The end thereof constitutes a central electrode 30' of the Hall disc 19', whereas the ends 24"–29" of the helically wound parts 24'–29' of the conductor portions 24–29 of the outer conductor 1 are arranged on the outer edge of the disc 19', where they constitute peripheral electrode portions.

An axial magnetic field is produced through the disc 19' by a permanent or electro-magnet (not shown).

Under the action of this field, the currents flowing through the disc in a radial direction between the peripheral electrode portions 24"–29" and the central electrode 30' are deflected, so that rotational currents are produced in the disc, around the centre thereof.

In order to improve the coupling of the terminals 3, 4 with the circular circuit formed by the disc itself, a coaxial winding 12" arranged against the disc 19' is used instead of the winding 12' surrounding the cable and the Hall body of FIG. 6. The operation of the embodiment shown in FIG. 7 is otherwise identical to that of the embodiment shown in FIG. 6.

Of course, apart from the embodiments described above, numerous further embodiments and variants may be imagined. For example, a transmission device according to the invention can be constructed with a transformer and a gyrator with a rhombic Hall plate, in which the acute angle $\gamma$ of this plate must, however, be so large that the product $\mu B$ exceeds tan $\alpha$, wherein $\alpha = 90° - \gamma$.

What is claimed is:

1. An electric transmission device having a preferred transmission direction comprising between first and second pairs of terminals a gyrator having input and output circuits, a transformer having first and second windings, means serially connecting said input circuit and first winding between the terminals of one of said pair of terminals, and means coupling said output circuit and second winding in parallel between the terminals of the other of said pair of terminals, whereby signals applied to said device reinforce each other in said gyrator and transformer in one transmission direction and oppose each other in the opposite direction.

2. An electric transmission device having a preferred transmission direction between first and second pairs of terminals comprising a gyrator having an input circuit and an output circuit, said gyrator comprising a thin body of semiconductive material having a high mobility of charge carriers, means providing a magnetic field normal to the main surface of said body, said body having a first pair of electrodes connected to said input circuit and a second pair of electrodes coupled to said body by the Hall effect connected to said output circuit, a transformer having first and second windings, means connecting said input circuit in series with one of said windings between the terminals of one of said pairs of terminals, and means coupling said output circuit in parallel with the other of said windings between the terminals of the other of said pairs of terminals, whereby signals applied to said device reinforce each other in said gyrator and transformer in one transmission direction and oppose each other in the opposite direction.

3. The device of claim 2 in which said body is plate shaped, and the direction between said first pair of electrodes is normal to the direction between said second pair of electrodes.

4. An electric transmission device having a preferred transmission direction between first and second pairs of terminals comprising a gyrator having input and output circuits, a transformer having first, second and third winding means, means serially connecting said input circuit and first winding means to said first pair of terminals, means connecting said output circuit to said second winding means, and means connecting said third winding means to said second pairs of terminals, whereby signals applied to one of said pairs of terminals said device reinforce each other in said gyrator and transformer in one transmission direction between said first and second pairs of terminals and oppose each other in the opposite direction.

5. The device of claim 4 in which said gyrator is a semiconductive body having high mobility of charge carriers, said first winding means and third winding means are inductively coupled to said body, and said second winding means comprises means closing a circuit within said semiconductor body whereby said last mentioned means is inductively coupled to said first and third winding means.

6. An electric transmission device having a preferred direction of transmission between a pair of first terminals and a pair of second terminals, comprising a gyrator, said gyrator comprising a body of semiconductive material of high charge carrier mobility and having at least one pair of electrodes on opposite edges of said body and means providing a magnetic field normal to the main surfaces of said body, first and second windings inductively coupled together, means connecting said first winding and pair of electrodes serially between said first terminals, means connecting said second winding between said second terminals, and Hall effect means coupling said body in parallel to said second winding whereby signals applied to said device reinforce each other in said gyrator and windings in one transmission direction between said first and second pairs of terminals and oppose each other in the opposite direction.

7. An electric transmission device having a preferred transmission direction between first and second pairs of terminals, said device comprising a gyrator having input and output circuits, a transformer having first and second inductively coupled windings, means serially connecting said input circuit and first winding between said first pair of terminals, means connecting said second winding in parallel with said output circuit, and means coupling said gyrator to said second pairs of terminals, the ratio of the mutual inductance of said windings to the inductance of said second winding being substantially equal to the absolute value of the ratio of transmission resistance of said gyrator in one direction to the resistance of the output circuit of said gyrator.

8. The device of claim 7, in which said second winding and output circuit are connected in parallel between said second pair of terminals.

9. The device of claim 7, in which said gyrator comprises a thin body of a semiconductive material having a high charge carrier mobility, means providing a magnetic field normal to the main surfaces of said body, a pair of electrodes disposed on opposite edges of said body and connected to one of said input and output circuits, and means coupling said body to the other of said input and output circuits by Hall effects in said body.

References Cited in the file of this patent

UNITED STATES PATENTS

| | | |
|---|---|---|
| 2,788,396 | Abraham | Apr. 9, 1957 |
| 2,862,189 | Kuhrt | Nov. 25, 1958 |
| 2,944,220 | Tellegen | July 5, 1960 |

FOREIGN PATENTS

| | | |
|---|---|---|
| 1,237,336 | France | June 20, 1960 |

OTHER REFERENCES

Tellegen article, vol. 3, No. 2, Phillips Research Reports, April 1948, pp. 81–101 relied upon.

Carlin: Proceedings of the IRE, May 1955, pp. 608–616.

Carlin: "Modern Advances in Microwave Techniques," edited by J. Fox, Brooklyn Polytechnic Institute, July 1955, pp. 175–204.

Keen: Proceedings of the IRE, June 1959, pp. 1148–1150.